Figure 1:
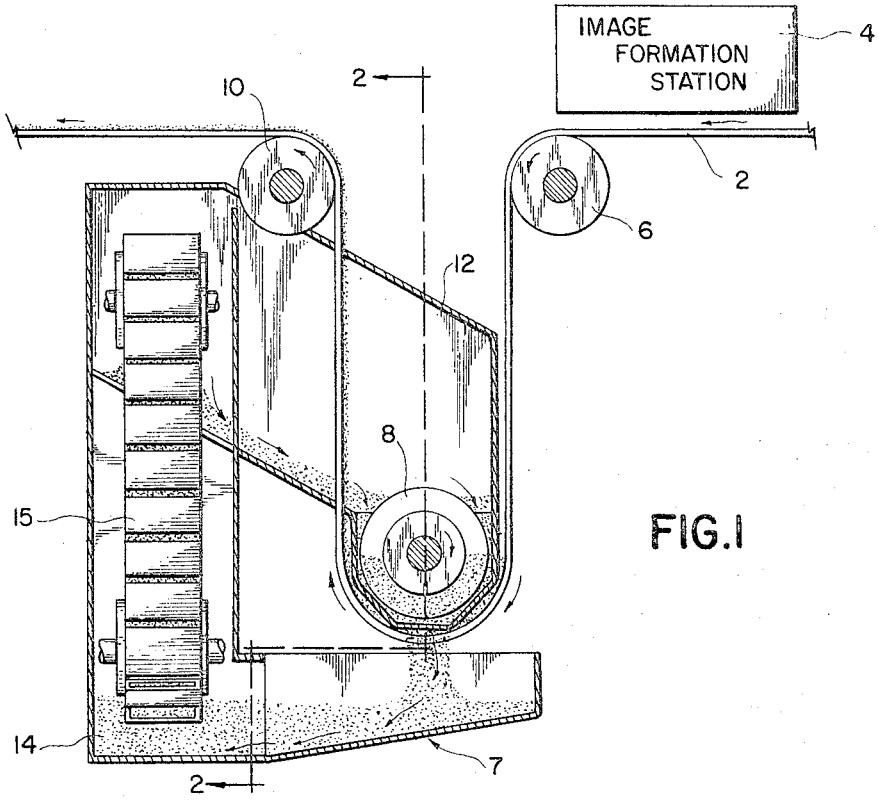
Figure 2:
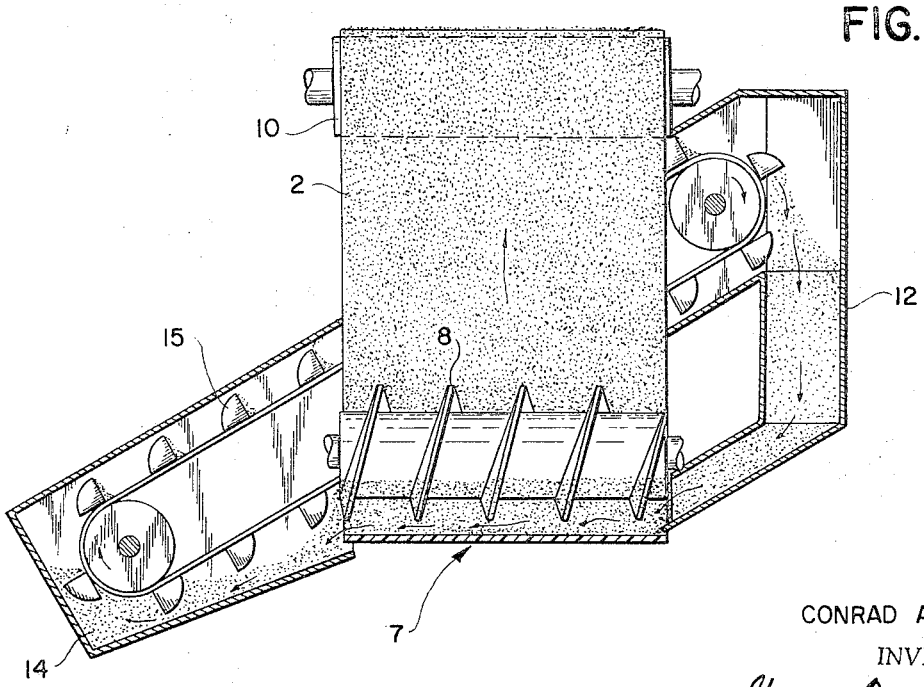

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 8, 1970

878 O.G. 239

T878,003
LATENT IMAGE DEVELOPMENT STATION

Conrad Altmann, 901 Elmgrove Road,
Rochester, N.Y. 14650

Filed Nov. 12, 1969, Ser. No. 875,814
Int. Cl. G03g *13/08*
U.S. Cl. 355—3

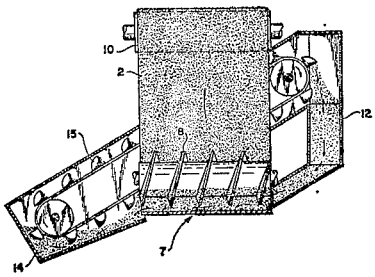

1 Sheet Drawing. 5 Pages Specification

An image development station is provided wherein a photoconductive web bearing an electrostatic image is moved through a development station along a path which forms a loop having an approximately 180° turn through which loop an auger extends. Developing powder is dropped onto the photoconductive material at the loop and the auger moves the development material thereacross as the photoconductive member moves along the loop so that development material is moved both longitudinally and laterally of the web to insure adequate development of a latent electrostatic image thereon.

Sept. 8, 1970 C. ALTMANN T878,003

LATENT IMAGE DEVELOPMENT STATION

Filed Nov. 12, 1969

CONRAD ALTMANN
INVENTOR.

BY Gary D. Fields
Robert W Hampton
ATTORNEYS